United States Patent [19]

Arnold et al.

[11] Patent Number: 5,172,091
[45] Date of Patent: Dec. 15, 1992

[54] ASYNCHRONOUS PARALLEL STATUS COMPARATOR

[76] Inventors: Jeffrey W. Arnold, 828 Hickory Ridge Rd., Aiken, S.C. 29801; Mark M. Hart, 223 Limerick Dr., Aiken, S.C. 29803

[21] Appl. No.: 678,428

[22] Filed: Apr. 1, 1991

[51] Int. Cl.[5] .............................. G06F 7/02
[52] U.S. Cl. .................................. 340/146.2
[58] Field of Search ............... 340/146.2; 364/736.5

[56] References Cited

U.S. PATENT DOCUMENTS

| | | | |
|---|---|---|---|
| 3,845,465 | 10/1974 | Hosick et al. | 340/146.2 |
| 3,962,680 | 6/1976 | Hirao | 340/146.2 |
| 4,558,422 | 12/1985 | DenBeste et al. | 364/480 |
| 4,578,666 | 3/1986 | Anderson | 340/146.2 |
| 4,728,925 | 3/1988 | Randle et al. | 340/146.2 |
| 4,728,927 | 3/1988 | Aman | 340/146.2 |
| 4,760,374 | 7/1988 | Moller | 340/146.2 |
| 4,847,877 | 7/1989 | Besseyre | 315/116 |

*Primary Examiner*—Long T. Nguyen
*Attorney, Agent, or Firm*—Harold M. Dixon; William R. Moser; Richard E. Constant

[57] ABSTRACT

Apparatus for matching asynchronously received signals and determining whether two or more out of a total number of possible signals match. The apparatus comprises, in one embodiment, an array of sensors positioned in discrete locations and in communication with one or more processors. The processors will receive signals if the sensors detect a change in the variable sensed from a nominal to a special condition and will transmit location information in the form of a digital data set to two or more receivers. The receivers collect, read, latch and acknowledge the data sets and forward them to decoders that produce an output signal for each data set received. The receivers also periodically reset the system following each scan of the sensor array. A comparator then determines if any two or more, as specified by the user, of the output signals corresponds to the same location. A sufficient number of matches produces a system output signal that activates a system to restore the array to its nominal condition.

10 Claims, 3 Drawing Sheets

ASYNCHRONOUS PARALLEL STATUS COMPARATOR

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to digital integrated circuitry for comparing sets of data. More specifically, the present invention is a method and apparatus for evaluating asynchronously received sets of data regarding the status of a system and looking for a match in two or more sets of such data.

2. Discussion of Background

Evaluating digital data values is an important function for process control and information management. Comparison of data values is often part of that evaluation. Typically data values are compared bit for bit. Sometimes the comparison is to determine whether the value represented by one set of bits in a data stream has a larger or smaller value than a set of bits in another stream; other systems compare sets of bits to determine if they match exactly. See U.S. Pat. Nos. 4,578,666 issued to Anderson, 4,728,925 issued to Randle, et al., for examples of devices that compare groups or sets of data.

It is sometimes important to know that information received in the form of a set of data is correct, to have confirmation that the condition indicated by the value of the data is in fact correct or at least statistically more likely to be correct than not. It may be that the confirming data may not arrive synchronously with the first data set. It may also be that the data must be processed very quickly for safety reasons, for protecting valuable equipment or for assuring high levels of quality in manufactured products. Circumstances where such a need occurs exist in industrial processes, in secure facilities, in air traffic control, and many other environments.

There is a need for a device that compares asynchronously received data quickly and reliably, and determines from that comparison whether the status of a system has changed in some important way.

SUMMARY OF THE INVENTION

Accoring to its major aspects, the present invention is an apparatus for comparing two or more asynchronously transmitted data sets to determine if there is a match between two or more of the sets. The signals are in the form of data sets that represent, in digital form, locations in an array of locations. The transmission of a data set is made if there has been a change in the status of a location from some nominal condition to a special condition.

Each location has at least one sensor. Each sensor senses the value of a condition related to or indicative of the status of that location or that which occupies it. As the change in value is perceived by the sensor, the fact of the change is communicated to a processor which transmits the data set identifying the location of that sensor to a receiver, which collects, reads, latches, and acknowledges the transmission, sends the data set to a decoder which assigns the data set to an output line and resets the system. The decoder generates an output signal on an output line if a data set has been received corresponding to that output line.

Preferably there will be several processors monitoring one or perhaps several different sensor arrays. Each processor sends its data set to a different receiver and thence to a different decoder. However, all the output lines of the decoders will be compared by a comparator to determine if there is a "match", that is, if any output line carries a signal corresponding to the same location in the monitored array as a signal on one or more other output lines. Based on a user supplied limit, some number of matches, say 2 of 4, will produce a system output signal to activate a system for responding to the change in the status of the array and restoring the condition at the location where the match was found to the nominal condition.

In a preferred embodiment, the receivers, decoders and comparator are all incorporated into a single integrated circuit chip for reliability and ruggedness.

The present invention has several features directed to assuring that a change in status of the array of positions has occurred. These features are important for preventing the taking of precipitous action based on spurious signals from the sensors. Conversely, if not all the processors receive signals from sensors at a location, perhaps because of a fault condition in the lines or one of the processors, appropriate action could still be initiated.

One of these features, in an alternative embodiment of the present invention, is the use of redundant, independent processors. Each may receive information from the same or different sensors, or different kinds of sensors, such as temperature and pressure sensors, to indicate a change in the condition of the array.

Another feature is the collecting, or buffering, of the data sets received in parallel from the processors. This feature helps to assure that all the bits of the digital data set are properly received before retransmitting the data set to the decoders.

Still another feature of the present invention is the acknowledgement by the receiver of receipt of the data set from the processor. This feature helps to assure that the data sets received by the receivers were those transmitted by the processors. Also, the system is reset at intervals, preferably after each processor scans its entire array of sensors.

Another feature is the comparison of the output signals of the decoders to determine whether there are any matches in the signals and whether the number of matches satisfies the user-supplied requirement. The user may specify 2-of-N to N-of-N, with N being the number of receivers. This feature allows the user to specify the number of matches required for initiating corrective action at levels greater than one, possibly spurious, sensor signal and yet less than unanimous agreement among the sensors of the same location.

Other features and advantages of the present invention will be apparent to those skilled in the art of data comparison from a careful reading of the Detailed Description of a Preferred Embodiment accompanied by the following drawings.

DETAILED DESCRIPTION OF A PREFERRED EMBODIMENT

Figure 1:
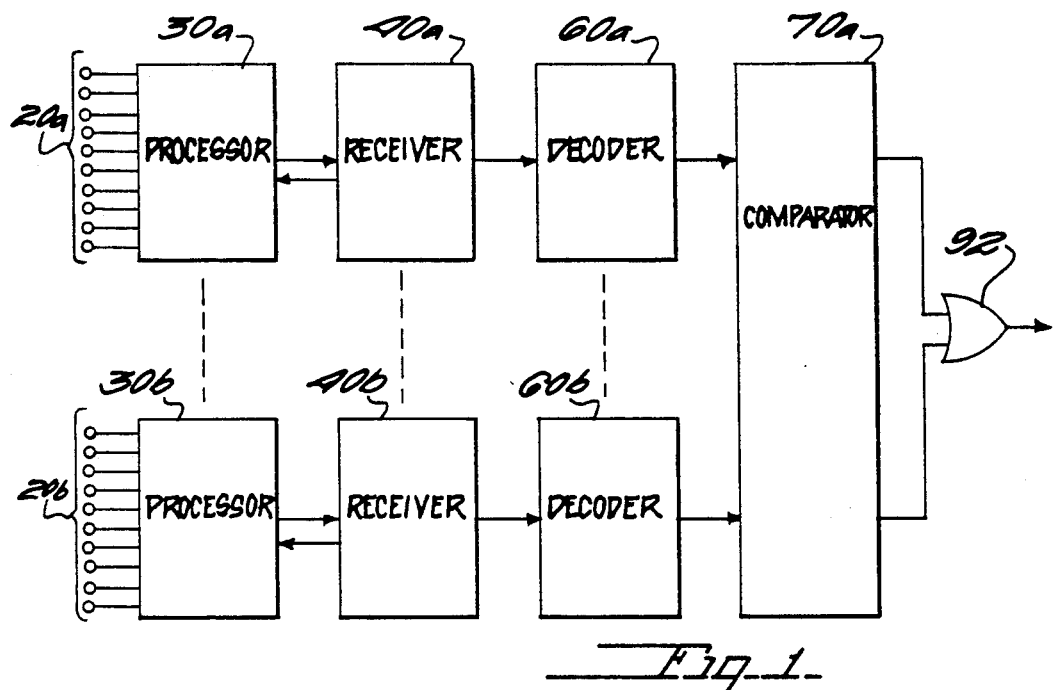
FIG. 1 is a schematic diagram of the system according to a preferred embodiment of the present invention.

Now, postulate a system having a number of locations, each of which has associated with it one or more variables. Each variable has a nominal range and a special range of values. The nominal range is the range of values that variable can have during normal circumstances; the special range is that range of values the variable can have during unusual, perhaps dangerous or harmful circumstances. If one variable associated with a location changes condition from the nominal range to the special range, it may be important to have a confirmation of the fact of that change by a second system, independent but parallel to the first, measuring the same or a related variable.

In certain cases several parallel systems can be established to follow the variables of the same set of locations. For example, fuel assemblies in nuclear reactors are located in certain fixed positions in the reactor core. The assembly positions may be fitted with four independent thermocouples to monitor the particular variable of temperature. As long as the value of the temperature variable is in the nominal range, the core can continue to operate safely. If, however, the temperature of at least one thermocouple of the four that are monitoring a location in the core exceeds the nominal range and enters a special temperature range, the reactor might have to be shut down. Because shuting down a reactor has major operational consequences, as does failing to shut it down, it is especially important to obtain confirmation that the temperature at that location is, in fact, in the special range. Therefore, independent computers are connected to each of the thermocouples in the reactor to evaluate the condition of each thermocouple and report the position or positions where a change in temperature from the nominal range to the special range has occurred. If some number of the computers, such as two, of the four report that, at the same location, one of their associated thermocouple's measurement has entered the special range, the reactor can be shut down on the basis that the temperature is more likely to have changed at that location than otherwise.

The devices that evaluate and report the locations where variables have changed from nominal to special conditions do not necessarily have to be monitoring the same variable. Confirmation of some event taking place at a location may be best when a second, variable, independent of the first also moves into the special range. In an industrial process, a change in temperature and pressure may signal trouble or simply a need to activate some other component, such as a pump. The confirmation of a temperature change by a pressure change in the same location will require the present invention.

To illustrate the present invention by several examples, in evaluating the data shown by several maps of portions of the earth made by different remote-sensing devices, the confirmation of a location having one "brightness value" in one sensing system may be made by a different brightness value in a map made by a different brightness system. In another example, confirmation of the existence of a object in the air in one set of coordinates as detected by radar at one airport can be confirmed by a radar at a second airport. Further, the present invention is applicable to manufacturing processes that use assembly lines where positions along the line can be monitored and, if confirming signals indicate some condition of the line at a particular location has changed to a special from a nominal condition, the line can be stopped or some other appropriate remedial action taken.

Although the term "location" is used to indicate a position, that is, a unique set of coordinates, it is actually used only metaphorically to indicate an address where the variable data is stored. For example, the present invention may be applicable to accounting of stock trading transactions. A change in price-to-earnings ratio in the stock of one company may "confirm" a change in inventory by the same company to suggest a buy or sell order.

Therefore, although the specific arrangement of the present invention would be determined by the specific application, the embodiment described below will be illustrative of one application, an extension of the invention to other embodiments will be readily apparent to those skilled in the art of data comparison.

Referring at this point to FIG. 1, the apparatus of the present invention comprises several sets of components arranged in parallel for alternately receiving and retransmitting information, ultimately bringing the information to a final component, namely a comparator, to yield a combined result. The heart of the invention is a group of sets of receivers, decoders and comparators in tandem sequences, which shall be described presently; however, the comparator ties the outputs of multiple receivers and decoders together by comparing the decoder outputs. In an alternative embodiment, the invention includes a system beginning with one or more arrays of sensors and concluding with a signal that initiates a response to information initially supplied by the sensors.

In FIG. 1 one or more sensors 20a, 20b, and so on, are placed proximate to a specific location in an array of locations to monitor a condition associated with that location or with a piece of equipment placed at that location. Sensors 20a are compared to sensors 20b by the second series of components in parallel with the first. A location in a nuclear reactor core, for example, may be monitored by sensors adapted for temperature, pressure, coolant flow rate, coolant level, or neutron flux. Each variable will have a value that falls into either a nominal range or a special range. The nominal range is the normal or acceptable range for the variable; the special range is outside the nominal range and is unacceptable or requires corrective action if confirmed.

The output of any sensors 20a, 20b detecting a change in the values of a variable from the nominal condition to the special condition is received by processors 30a, 30b, preferably computers, that identify the location of the sensors and transmit the locations of those sensors to receivers 40a, 40b. An array of sensors 20a, 20b are connected to processors 30a, 30b. In the example given of a nuclear reactor core, four thermocouples beneath each fuel assembly location can monitor, or sense, temperature changes in each assembly location and transmit the fact of the change in temperature to four independent processors that monitor the thermocouple arrays.

Figure 2:
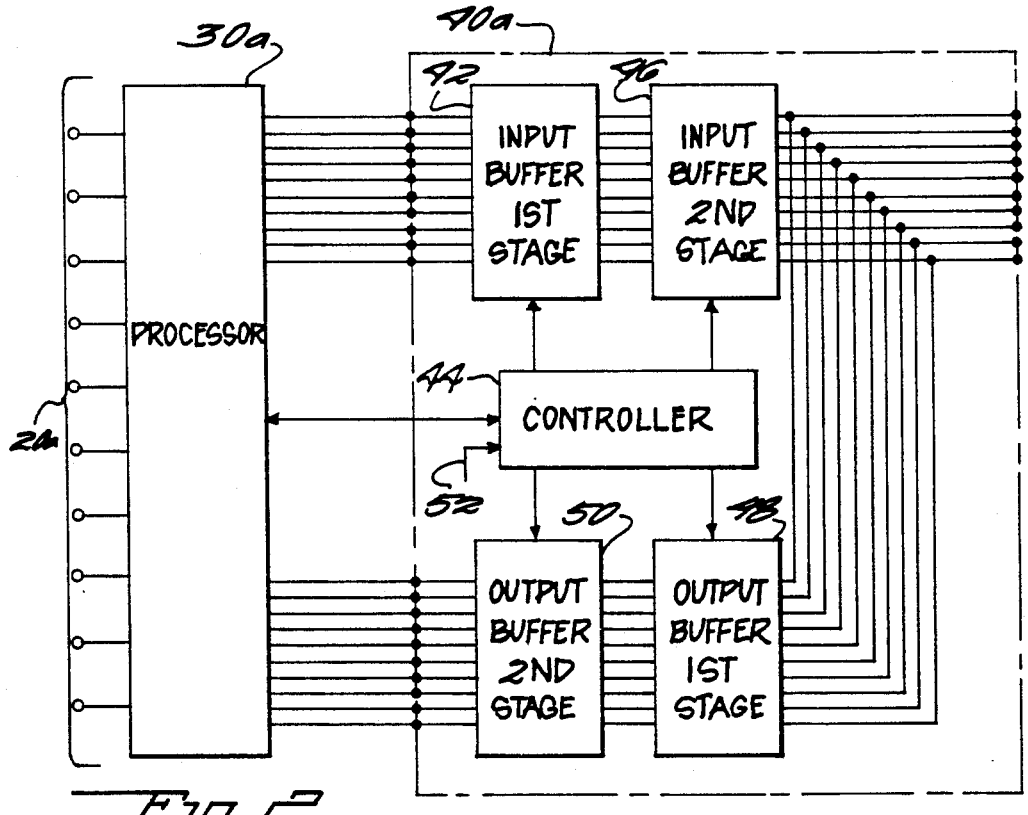
FIG. 2 is a schematic diagram of a portion of the preferred embodiment of the present invention showing in particular the receiver.

Receivers 40a, 40b receive the location information transmitted by processor 30a, 30b in the form of a set of digital bits, a data set, sent in parallel. If a reactor core has, say, 600 monitored locations, it will need a ten bit data set to represent at least 600 locations. Receivers 40a, 40b, in receiving the data set, will collect, read, latch and acknowledge the data set. Preferably after each complete scan of the array of sensors corresponding to each receiver, the system is reset periodically according to the scan cycle. As seen best in FIG. 2, where the dashed lines indicate receiver 40a, the data set comes into receiver 40a from processor 30a to a first stage 42 of an input buffer which collects all bits of the data set. A controller 44 in communication with first stage 42 then causes the data set to be latched into a second stage 46 of the input buffer and to be transfered on command of controller 44, latched to a first stage 48 of an output buffer and go through a second stage 50 of output buffer for acknowledgement to processor 30a. Controller 44 controls the buffers 42, 46, 48 and 50 according to the system clock 52 and is in communication with processor 30a for echoing transmission and acknowledgement and resets the system after each scan of the sensors of the array.

Figure 3:
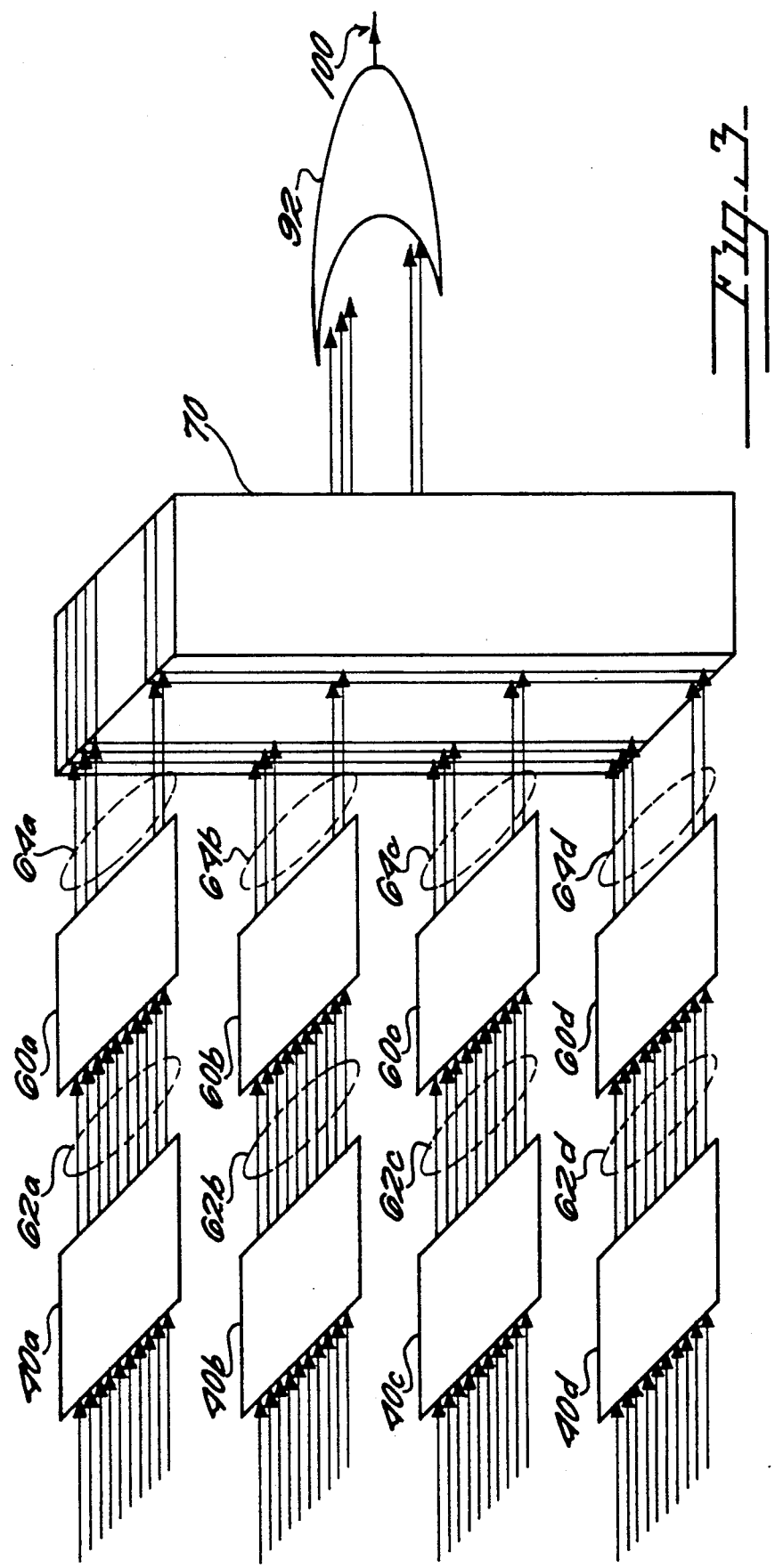
FIG. 3 is a schematic diagram of the analysis portion of the analysis portion of the system according to the present invention.

Receivers 40a, 40b transmit their read and acknowledged data set to decoders 60a, 60b (FIGS. 1 and 3). For each receiver 40a, 40b, there is a decoder 60a, 60b. In FIG. 3, four receivers, 40a, 40b, 40c, and 40d and four decoders 60a, 60b, 60c, and 60d are shown. Decoders 60a, 60b, 60c, and 60d receive in parallel the data set on its input lines 62a, 62b, 62c, and 62d, respectively, and assign each data set to a single output line 64a, 64b, 64c, and 64d, respectively, one output line for each location plus administrative lines. If there are 600 locations being monitored by four processors, there will be at least 600 output lines on each of the four decoders. When a data set appears at input lines 62a, 62b, 62c, and 62d, an output signal will appear at the output line 64a, 64b, 64c, and 64d corresponding to that data set.

If more than one processor 30a, 30b (FIG. 1) has received an indication that a variable being monitored at a particular location has changed from the nominal to the special condition, each will transmit a data set representing the same location to its respective receiver and thence to its corresponding decoder. The output signals from each decoder 60a, 60b, 60c, 60d are channeled to a comparator 70 which looks for output signals corresponding to the same locations and for the requisite number of matches.

If there are four processors and receivers, the user may decide that if any two, three or four processors transmit data sets corresponding to the same location, corrective or restorative action should be taken so that the varible sensed changes back from the special to the nominal condition. Comparator 70 will compare the latched outputs of decoders 60a, 60b, 60c, and 60d to find the matching positions and determine if the requisite number of matches is present.

Figure 4:
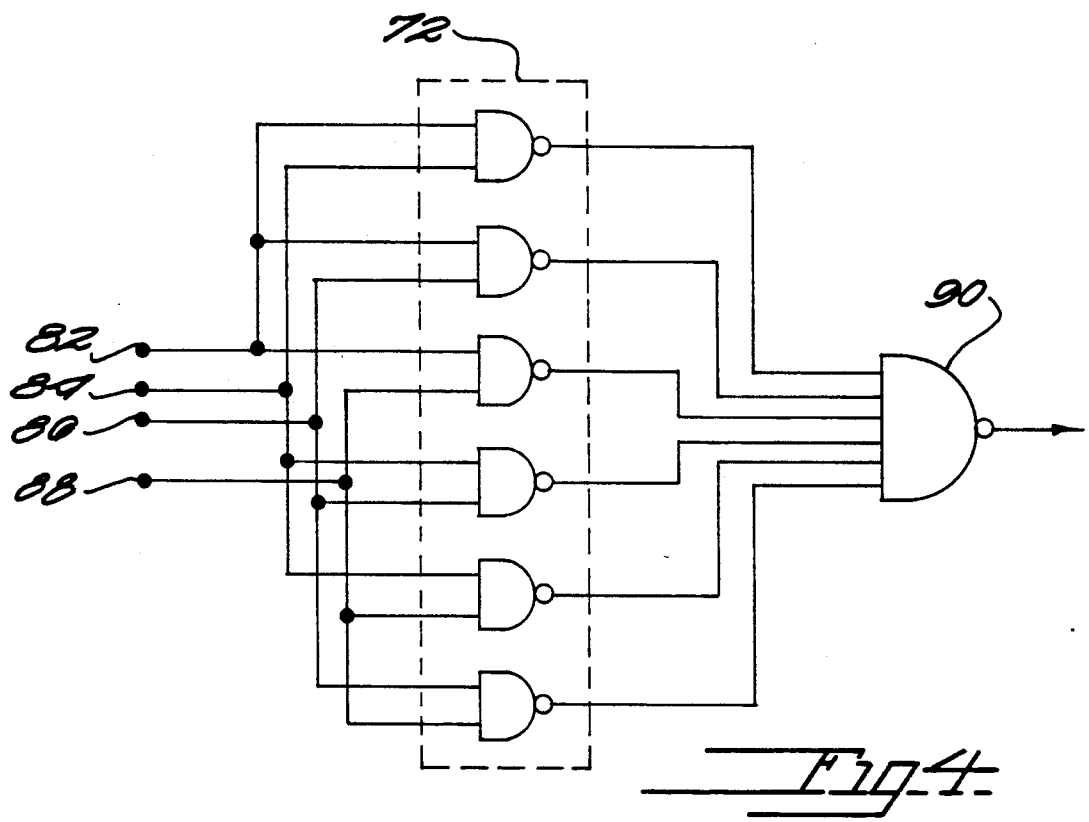
FIG. 4 is an electrical block diagram of the 2-of-4 logic circuitry according to an embodiment of the present invention.

FIG. 4 shows an example of digital logic components to enable comparator 70 to produce a system output signal for a 2-of-4 comparator. Comparator 70 has a series of six NAND gates 72 receiving input from each combination of two output signals 64a, 64b, 64c, and 64d from the four decoders 60a, 60b, 60c, and 60d (FIG. 3), respectively. The four decoders 60a, 60b, 60c, and 60d have output lines 82, 84, 86, and 88, for each one of the 600 decoder outputs, that each go to three of the six NAND gates 72. If any two output lines have an output signal, one of the six NAND gates 72 will produce a logic "low" at its output. The combined outputs of the six NAND gates 72 feed into another NAND gate 90. If any one NAND gate 72 goes "low", NAND gate 90 will go to a logic "high" and produce an input signal to OR gate 92 (see FIG. 3) which is "OR-ed" with the 600 other outputs for a system output signal at 100.

In to FIG. 3, the output of comparator 70 feeds into "OR" gate 92 the output of which goes "high" if, at any one of the 600 locations in this illustration, there are at least two of four signals produced by the four thermocouples indicating a special condition exists. A high signal output 100 from OR gate 92 will be sent to the facility for an appropriate response. For example, the facility response can be the activation of one or more banks of control rods and safety rods to shut down a nuclear reactor core if the temperature at a specific location goes above a certain set point, as confirmed on a 2-out-of-4 basis. The facility response can be the activation, or deactivation, of a pump if the changed condition is reflective of a change in the level of a process fluid above a certain level at a specific location as confirmed by, say, a pressure level exceeding a setpoint at that location, or the stopping of an assembly line conveyor belt. The specific system response would of course be tailored to the type of change sensed.

It will be apparent to those skilled in the art that many substitutions and modifications can be made to the preferred embodiments described above without departing from the spirit and scope of the invention which is to be defined by the appended claims.

What is claimed is:

1. An apparatus for comparing data sets transmitted by a plurality of processors, each data set representing a location, each processor transmitting one of said data sets when a value of a variable corresponding to a condition at said location changes from a nominal range to a special range, said apparatus comprising:
   means for receiving each of said data sets, said receiving means acknowledging receipt of said data sets received by said receiving means, said receiving means having
      means for reading said data sets transmitted by said plurality of processors,
      means for latching said data sets read by said reading means, and
      means for resetting said apparatus at intervals;
   means for generating signals for any of said data sets received by said receiving means; and
   means for comparing said signals generated by said generating means to determine whether said signals correspond to the same location.

2. The apparatus as recited in claim 1, wherein said generating means further comprises:
   a plurality of output lines, one line for each data set; and
   means for assigning each data set to one of said output lines, said output line having a signal when said data set is received by said generating means.

3. The apparatus as recited in claim 1, wherein said receiving means, said generating means and said comparing means are incorporated into a single integrated circuit chip.

4. An apparatus for determining a status of a position in an array of positions, each of said positions associated with means for sensing at least one condition of said array, said at least one condition indicative of said status of said array, each sensing means in communication with means for determining whether a value of said at least one condition is in a normal range or is in a special range and for identifying said position associated with said sensing means in the form of a data set, said determining means transmitting said data set when said sensing means determines said value at said position is in said special range, said apparatus comprising:

means for receiving at least one of said data sets transmitted from said determining means, said receiving means having
means for collecting said data sets;
means for reading said data sets collected by said collecting means,
means for acknowledging receipt of said data sets read by said reading means, and
means for resetting said apparatus at intervals;
means for producing output signals in response to data sets received by said receiving means; and
means responsive to said output signals for comparing said output signals to determine whether said output signals correspond to the same position of said array of positions, said comparing means producing a system output signal.

5. The apparatus as recited in claim 4, wherein said producing means further comprises:
a plurality of output lines, one of said output lines for each of said data sets; and
means for assigning each of said data sets read by said reading means to one of said output lines, said output line having an output signal when said data set is assigned to said output line.

6. The apparatus as recited in claim 4, wherein said comparing means produces said system output signal on receipt of at least two but less than all output signals from the same position.

7. The apparatus as recited in claim 4, wherein said receiving means, said comparing means and said producing means are incorporated into a single integrated circuit chip.

8. An apparatus for evaluating a status of a system defining an array of positions, said status indicated by values of at least one condition in each position, said apparatus comprising:
a first sensor array for sensing said values of a first condition in said array of positions, each sensor of said first sensor array corresponding to a different position of said array of positions;
a second sensor array for sensing said values of a second condition in said array of positions, each sensor of said second sensor array corresponding to a different position of said array of positions;
a first processor for determining whether sensors of said first sensor array have sensed a change in the values of said sensors from a nominal range to a special range of said first condition, said first processor transmitting a data set identifying a particular position in said array of positions for any sensor that has changed from said nominal to said special range of said first condition;
a second processor for determining whether sensors of said first sensor array have sensed a change in said values of said sensor from a nominal range to a special range of said second condition, said second processor transmitting a data set identifying a particular position in said array of positions for any sensor that has changed from said nominal to said special range of said second condition;
a first receiver for receiving any data sets from said first processor, said first receiver acknowledging receipt of data sets received from said second processor;
a second receiver for receiving any data sets from said second processor, said second receiver acknowledging receipt of data sets received from said second processor;
a first decoder in communication with said first receiver and having input lines and output lines, said input lines for receiving data sets and assigning each data set to one of said output lines, said one of said output lines having an output signal when a data set is received by said first decoder from said first receiver;
a second decoder in communication with said second receiver and having input lines and output lines, said output lines for receiving data sets and assigning each data set to one of said output lines, said one of said output lines having an output signal when a data set is received by said second decoder from said second receiver; and
means in communication with said outputs of said first and second decoders for comparing said output signal from said first decoder to said output signal from said second decoder to determine whether said output signals from said first and said second decoders correspond to the same position.

9. The apparatus as recited in claim 8, further comprising:
a system for restoring said first condition of said position from said special range to said nominal range and said second condition of said position from said special range to said nominal range; and
means in communication with said comparing means for activating said system.

10. The apparatus as recited in claim 8, further comprising:
at least one additional sensor array for sensing the values of at least one additional condition of said array of positions, each sensor of said at least one additional sensor array corresponding to a different position of said array of positions;
at least one additional processor for determining whether sensors of said at least one additional sensor array have sensed a change in the values of said sensors from a nominal range to a special range of said first condition, said at least one additional processor transmitting a data set identifying the position in said array for any sensor that has changed from said nominal to said special range of said first condition;
at least one additional receiver for receiving any data sets from said at least one additional processor, said at least one additional receiver confirming receipt of data sets received from said at least one additional second processors;
at least one additional decoder in communication with said at least one additional receiver and having input lines and output lines, said input lines for receiving data sets and assigning each data set to one of said output lines, said one of said output lines having an output signal when a data set is received by said at least one additional decoder from said at least one additional receiver,
said comparing means comparing said output signal from said at least one additional decoder means with said output signals from said first and second decoders to determine whether said output signals from any two or more of said first said second and said at least one additional decoders correspond to the same position.

* * * * *